(12) United States Patent
Seifert et al.

(10) Patent No.: US 11,428,197 B2
(45) Date of Patent: Aug. 30, 2022

(54) FUEL PUMP

(71) Applicant: Robert Bosch GmbH, Stuttgart (DE)

(72) Inventors: John Seifert, Kalkaska, MI (US); Jens Leistert, Stuttgart (DE); Stefan Brueckl, Fuerth (DE); Christian Dingfelder, Herzogenaurach (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 16/497,708

(22) PCT Filed: Mar. 21, 2018

(86) PCT No.: PCT/EP2018/057142
§ 371 (c)(1),
(2) Date: Sep. 25, 2019

(87) PCT Pub. No.: WO2018/197113
PCT Pub. Date: Nov. 1, 2018

(65) Prior Publication Data
US 2021/0277858 A1    Sep. 9, 2021

(30) Foreign Application Priority Data

Apr. 28, 2017 (DE) ............ 10 2017 207 207.5

(51) Int. Cl.
*F02M 59/48* (2006.01)
*F04B 53/22* (2006.01)
(Continued)

(52) U.S. Cl.
CPC ............. *F02M 59/48* (2013.01); *F04B 53/16* (2013.01); *F04B 53/22* (2013.01);
(Continued)

(58) Field of Classification Search
CPC ......... F02M 2200/85; F02M 2200/855; F02M 59/48; F04B 4/004; F04B 41/002; F04B 53/16; F04B 53/22
See application file for complete search history.

(56) References Cited

U.S. PATENT DOCUMENTS

| | | | | |
|---|---|---|---|---|
| 3,556,570 A | * | 1/1971 | Cosenza | F16B 37/04 411/176 |
| 3,560,132 A | * | 2/1971 | Gulistan | F16B 35/00 411/361 |

(Continued)

FOREIGN PATENT DOCUMENTS

| | | |
|---|---|---|
| CN | 101080571 A | 11/2007 |
| CN | 101907120 A | 12/2010 |

(Continued)

OTHER PUBLICATIONS

International Search Report corresponding to PCT Application No. PCT/EP2018/057142, dated Jun. 7, 2018 (German and English language document) (7 pages).

*Primary Examiner* — John M Zaleskas
(74) *Attorney, Agent, or Firm* — Maginot Moore & Beck LLP (57) ABSTRACT

A fuel pump for a fuel injection system of an internal combustion engine includes a pump housing and a fastening section which is present on the pump housing for fastening the fuel pump to a base, in particular an engine block. The fastening section has a through opening for receiving a holding element for a fastening means, in particular a screw. At least one radially inwardly directed projection is present at least in an end region of the through opening, the end region facing the base in the installed position.

14 Claims, 7 Drawing Sheets

(51) Int. Cl.
*F04B 53/16* (2006.01)
*F16B 4/00* (2006.01)
*F16B 41/00* (2006.01)

(52) U.S. Cl.
CPC ........ *F02M 2200/855* (2013.01); *F16B 4/004* (2013.01); *F16B 41/002* (2013.01)

(56) References Cited

U.S. PATENT DOCUMENTS

| | | | | | |
|---|---|---|---|---|---|
| 4,561,796 | A * | 12/1985 | Hanoka | ................... | F02P 5/02 403/4 |
| 5,020,951 | A * | 6/1991 | Smith | ................... | F01L 1/46 411/107 |
| 5,395,194 | A * | 3/1995 | Johnson | ................... | F16B 5/025 29/525.11 |
| 5,626,121 | A * | 5/1997 | Kushida | ................... | F02M 59/466 123/514 |
| 6,309,157 | B1 * | 10/2001 | Amann | ................... | F16B 41/002 411/353 |
| 6,585,468 | B2 * | 7/2003 | Johnson | ................... | F16B 41/002 29/437 |
| 2004/0213645 | A1 * | 10/2004 | Kovac | ................... | F16B 5/0258 411/512 |
| 2006/0056936 | A1 * | 3/2006 | Ishimaru | ................... | F16B 41/002 411/81 |
| 2009/0136318 | A1 * | 5/2009 | Hartmann | ................... | F16B 41/002 411/353 |
| 2010/0226715 | A1 * | 9/2010 | Schneider | ................... | F16B 5/02 403/350 |
| 2011/0253109 | A1 * | 10/2011 | Usui | ................... | F04B 1/0404 123/509 |
| 2011/0286813 | A1 * | 11/2011 | Szczukowski | ................... | F16B 41/002 411/353 |
| 2013/0121786 | A1 * | 5/2013 | Sjoeholm | ................... | F16B 43/00 411/337 |
| 2014/0193280 | A1 * | 7/2014 | Saito | ................... | F02M 55/04 417/540 |
| 2014/0356095 | A1 * | 12/2014 | Buchen | ................... | F16B 41/002 411/112 |
| 2015/0075496 | A1 * | 3/2015 | Pasquali | ................... | F02M 63/0275 123/469 |
| 2018/0030942 | A1 * | 2/2018 | Madsen | ................... | F02M 61/145 |
| 2019/0136855 | A1 * | 5/2019 | Heinemann | ................... | F04B 53/16 |
| 2019/0145366 | A1 * | 5/2019 | Heinemann | ................... | F02M 59/48 123/470 |

FOREIGN PATENT DOCUMENTS

| | | | | |
|---|---|---|---|---|
| CN | 102200164 A | | 9/2011 | |
| CN | 104214193 A | | 12/2014 | |
| CN | 204025299 U | | 12/2014 | |
| CN | 104454276 A | | 3/2015 | |
| CN | 205559253 U | | 9/2016 | |
| DE | 36 43 961 A1 | | 6/1988 | |
| DE | 9308096 U1 | * | 7/1993 | ............. F16B 39/22 |
| DE | 10310164 A1 | * | 10/2003 | ............. H01R 4/302 |
| DE | 10 2005 007 806 A1 | | 7/2006 | |
| DE | 10 2005 007 807 A1 | | 7/2006 | |
| DE | 102005007807 A1 | * | 7/2006 | ............. F16B 5/0208 |
| DE | 102007041363 A1 | * | 3/2008 | ............. F16B 41/002 |
| DE | 102014106713 A1 | | 11/2015 | |
| DE | 10 2014 016 713 A1 | | 3/2016 | |
| DE | 102014016713 A1 | * | 3/2016 | ............. F16B 41/002 |
| EP | 0 633 404 A1 | | 1/1995 | |
| EP | 2 369 189 A1 | | 9/2011 | |
| EP | 2369189 A1 | * | 9/2011 | ............. F16B 41/002 |
| GB | 1398743 A | * | 6/1975 | ............. F02M 55/001 |
| GB | 2539969 A | * | 1/2017 | ............. F02M 59/027 |

\* cited by examiner

FUEL PUMP

This application is a 35 U.S.C. § 371 National Stage Application of PCT/EP2018/057142, filed on Mar. 21, 2018, which claims the benefit of priority to Serial No. DE 10 2017 207 207.5, filed on Apr. 28, 2017 in Germany, the disclosures of which are incorporated herein by reference in their entirety.

BACKGROUND

The disclosure relates to a fuel injection system of an internal combustion engine.

Such a fuel pump is known from DE 10 2005 007 806 A1. It comprises a pump housing and a fastening section in the form of a fastening flange. This is fastened to the pump housing and has 2 through openings, into each of which one screw can be inserted. Using these screws, the fuel pump can be fastened to a base, for instance a cylinder head of the internal combustion engine.

SUMMARY

The underlying problem of the disclosure is solved by a fuel pump with the characteristics disclosed herein. In addition, additional features for the disclosure can be found in the following description and in the drawing. These features can be utilized in the disclosure both individually and in various combinations.

In accordance with the disclosure, a fuel pump for a fuel injection system of an internal combustion engine is proposed, comprising a pump housing and a fastening section which is present on the pump housing and which serves for fastening the fuel pump to a base, in particular an engine block, wherein the fastening section has a through opening for receiving a holding element for a fastener, in particular a screw. At least one radially inwardly directed projection is present at least in an end region of the through opening, which end region faces the base in the installed position.

The disclosure is based on the following consideration: fuel pumps for mounting on the base are usually equipped in advance with the respective fasteners, e.g. screws. For this purpose, a ring-shaped or sleeve-shaped plastic holding element, also known as a "retainer", is accommodated in the through opening. The holding element is usually held with a press fit in the through opening.

The fastener in turn is inserted into this holding element. The inner wall of the holding element is designed or dimensioned in such a way that the fastener is held securely in the holding element and thus in the through opening prior to the mounting, that is to say for example already during the transport and during the storage of the fuel pump. For example, the fastener can be held with a slight press fit in the holding element. At the same time, the inner wall of the fastener is designed in such a way that the fastener can easily be connected to the base during the mounting, for example can, in the case of a screw, be screwed in easily and without any significant resistance.

By means of the projection provided in this disclosure, the holding element is axially fixed in the through opening at least toward the base, so that the holding element together with the fastener cannot be pushed out of the through opening, not only during the mounting already but also during transport. Slipping out is therefore prevented in the case of any kind of application of force or torque to the holding element and/or the fastener. A type of "interlocking" connection of the holding element with the fastening section is created by the projection in this disclosure and the taper caused by said projection in the end region, facing the base, of the through opening in which the holding element is held. As the holding element is securely held in the through opening, a clamping of the holding element between the fastener and the base is prevented during the final mounting. Ultimately, the final mounting of the fuel pump on the base is made easier and more reliable.

In an initial further development, it is suggested that at least one radially inwardly directed projection also be present in an end region of the through opening, which end region faces away from the base in the installed position. It is to be understood here that this projection can only be produced after inserting the holding element into the through opening, whereas the projection present in the end region facing toward the base can be produced both before and after inserting the holding element into the through opening. This additional projection secures the holding element in both axial directions of the through opening.

Furthermore, it is possible that the projection only extends over a part of the inner circumference of the through opening. This is very simple and can be produced without great effort.

In a further development, it is suggested that multiple projections arranged evenly distributed over the inner circumference be present. This improves the support of the holding element and thus the secure grip of the holding element in the through opening.

Production is simplified if multiple projections arranged unevenly distributed over the inner circumference are present. It is for instance feasible that pairs of projections are provided opposite one another.

A particularly reliable grip of the holding element in the through opening is ensured if a single projection, preferably extending over the entire inner circumference, is present.

Another further development of the disclosure envisages that the through opening is produced by means of a punching process, and that the projection is produced during the punching process of the through opening. This simplifies and speeds up the production of the fastening section.

Alternatively, it is possible that the projection is produced by means of a material displacement, in particular by means of caulking. This is also an inexpensive and reliable way to produce the projection. This applies in particular to a projection present in the end region, facing away from the base, of the through opening.

It is possible that the projection, when viewed in an axial direction of the through opening, has an approximately semi-circular, tapered or polygonal outer contour. This is easy and unproblematic to produce.

It is also possible, however, that the projection, when viewed in an axial direction of the through opening, has an outer contour which is elongate when viewed in the circumferential direction, in particular an outer contour curved around a central axis of the through opening. This improves the support of the holding element on the projection.

BRIEF DESCRIPTION OF THE DRAWINGS

In the following, forms of the disclosure are explained with reference to the attached drawing, in which.

DETAILED DESCRIPTION

Figure 1:
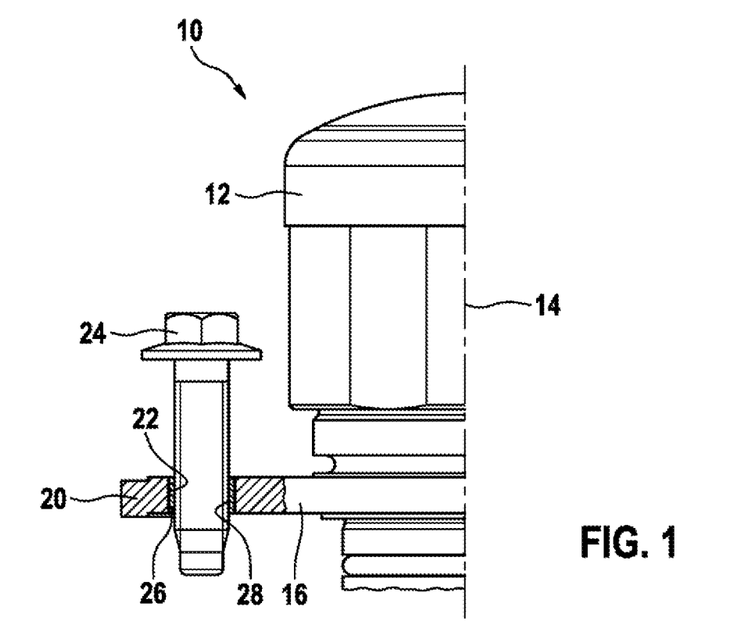
FIG. 1 shows a partial section through a fuel pump with a fastening section.

In FIG. 1, a fuel pump bears the number 10 throughout. In the present case, this is a piston high-pressure fuel pump for a fuel injection system of an internal combustion engine, which compresses gasoline to a high pressure and delivers it to injection devices of the internal combustion engine. In principle, however, it is also possible that the fuel pump is one that compresses diesel and delivers it to corresponding injection devices of an internal combustion engine.

Figure 3:
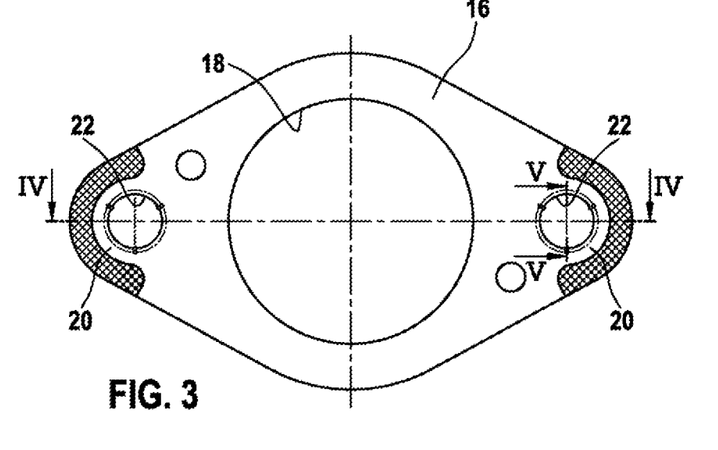
FIG. 3 shows a plan view of the fastening section as shown in FIG. 1.
Figure 4:
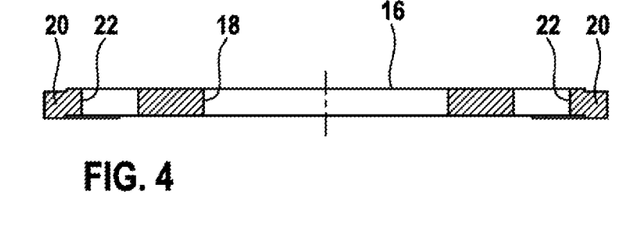
FIG. 4 shows a section along the line IV-IV as shown in FIG. 1.

The fuel pump 10 comprises a pump housing 12, which is overall cylindrical in shape with a longitudinal axis 14. FIG. 1 shows only that region of the fuel pump 10 which is located to the left of the longitudinal axis 14. A fastening section 16 is fastened to the pump housing 12. Particularly as shown in FIG. 3, the fastening section 16 is formed as a flange with a central opening 18 by means of which the fastening section 16 is fastened to the pump housing 12, for example by means of welding. The fastening section 16 also includes two lateral and oppositely arranged flange sections 20, in each of which a through opening 22 is present. The fastening section 16 is a punched part. The opening 18 as well as the two through openings 22 are also each produced by punching.

The through openings 22 are used to fasten the fuel pump 10 to a base by means of one screw 24 each. The base can, for example, be a cylinder head of an internal combustion engine. The base is however not shown in FIGS. 1 and 2.

Figure 2:
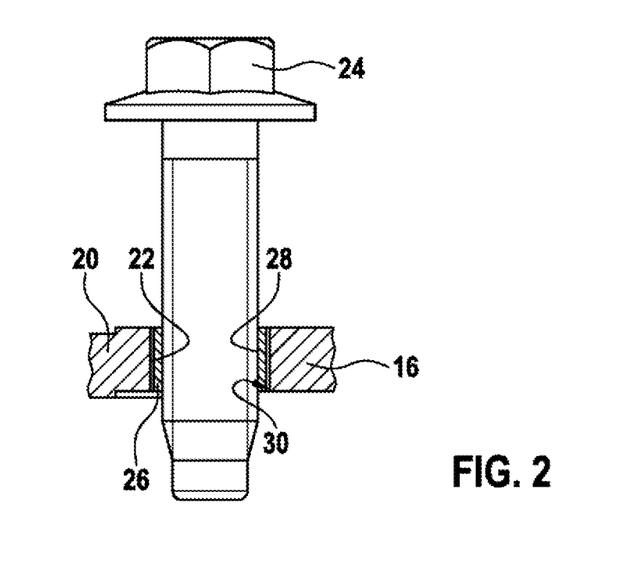
FIG. 2 shows part of the fastening section of the fuel pump as shown in FIG. 1.

The fuel pump is already equipped with the two screws 24 before being mounted on the base. This condition is shown in FIGS. 1 and 2. To ensure that the two screws 24 are securely held on the fuel pump 10 in this condition, a holding element 26 is press-fitted in each of the two through openings 22.

The holding element 26 has overall a cylindrical and annular or sleeve-like shape. It may, for example, be made of, or include, plastics. An inner wall surface 28 of the holding element 26 is formed, and dimensioned relative to the outer diameter of the screw 24, in such a way that, on the one hand, the screw 24 is securely held in the holding element 26, but on the other hand, during the mounting of the fuel pump 10 on the base, the screw 24 can also be screwed into a corresponding threaded hole in the base without considerable additional expenditure of force. Basically, the screw 24 is held with a slight press fit in the holding element 26.

Figure 5:
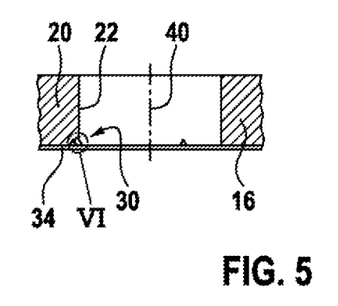
FIG. 5 shows a section along the line V-V as shown in FIG. 1.
Figure 6:
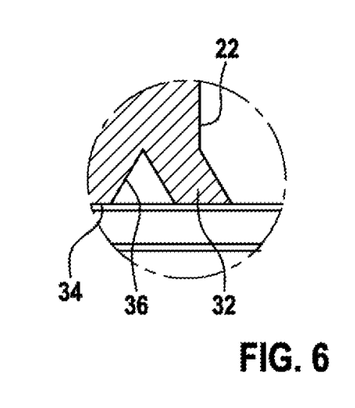
FIG. 6 shows a detail VI as shown in FIG. 5.

To prevent the holding element 26 in FIGS. 1 and 2 from being pressed axially downward out of the through opening 22 both before the mounting of the fuel pump 10 on the base and during the mounting, as can be seen from FIGS. 5 and 6, in an end region 30 of the through opening 22 which faces the base in the installed position and which is at the bottom in FIGS. 5 and 6, there are three projections 32 which are arranged evenly distributed over the inner circumference of the through opening 22 and which are directed radially inwards.

Figure 7:
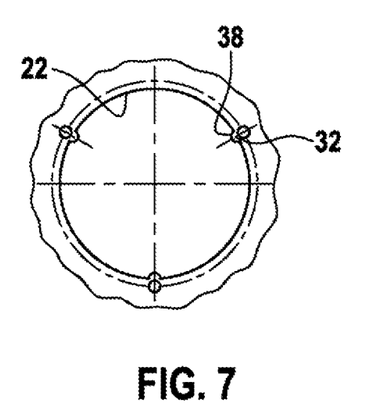
FIG. 7 shows a schematic axial view of the through opening of the fastening section of the fuel pump as shown in FIG. 1.
Figure 8:
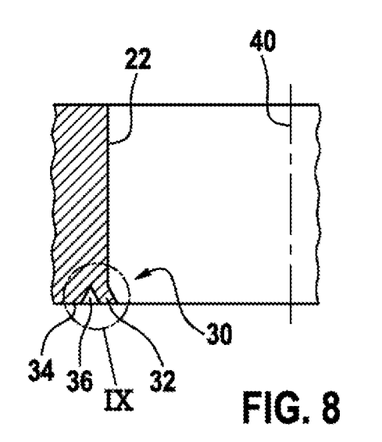
FIG. 8 shows an enlarged longitudinal section through a region of the through opening as shown in FIG. 7.
Figure 9:
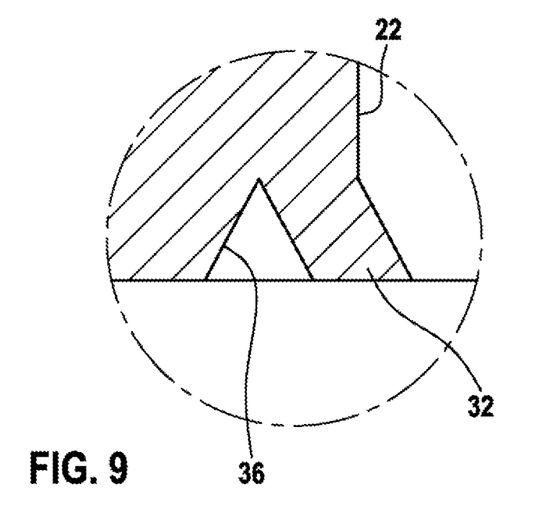
FIG. 9 shows a detail IX as shown in FIG. 8.

In the case of the first form shown in FIGS. 1-9, said projections are produced by means of a material displacement, for example by means of caulking. This caulking produces an embossing 36 on an axial face 34 of flange section 20. As can be seen in FIGS. 5 and 7, the projections 32 have in the axial view from above as shown in FIG. 7 an approximately semi-circular outer contour 38, and they extend only over a part of the inner circumference of the through opening 22 (in FIG. 7 and the subsequent corresponding figures, only one of the projections is provided with a reference number in each case for the sake of simplicity). In the radial plan view as shown in FIG. 5, the projections 32 have an approximately triangular basic shape.

The three projections 32 in this form reduce the free cross section of the through opening 22 in the lower end region 30, thereby forming a kind of stop for the holding element 26, which prevents it from being pressed downward out of the through opening 22 in the Figures.

In the following, further alternative forms of projections 32 will be explained, which are all shown in the case of a fastening section 16 as shown in FIGS. 1 and 2 or may also be present in a fastening section with an entirely different design. Elements and regions which have equivalent functions to elements and regions already mentioned above have the same reference numbers. Normally, they will not be explained in detail again, with reference rather being made predominantly only to the differences in relation to previous forms.

Figure 10:
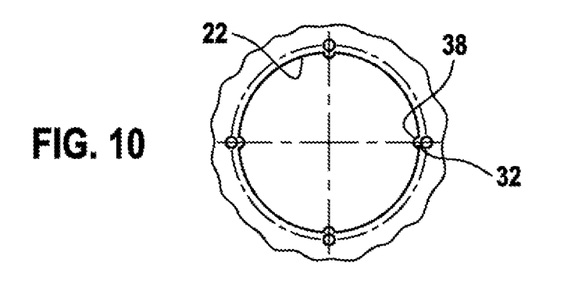
FIG. 10 shows an illustration similar to that shown in FIG. 7 of a second form of the through opening.

In the form as shown in FIG. 10, instead of three projections arranged at an angle of 120° to each other, four projections 32 distributed evenly over the inner circumference of the through opening 22, and thus arranged at an angle of 90° to each other, are present.

Figure 11:
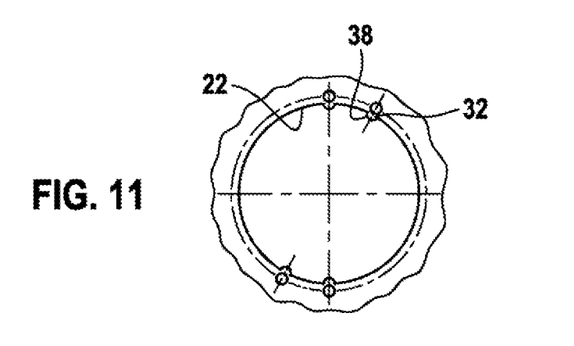
FIG. 11 shows an illustration similar to that shown in FIG. 7 of a third form of the through opening.

In the form as shown in FIG. 11, four projections 32 are arranged unevenly distributed over the inner circumference of the through opening 22, in pairs, the two projections 32 of a pair being arranged at an angle of 60° to each other, and the two projections 32 of a pair being arranged 180° opposite to the two projections 32 of the other pair.

In the form as shown in FIGS. 12 and 13, again three projections 32 are arranged evenly over the inner circumference of the through opening 22. In the axial plan view shown in FIG. 12, these projections 32 however have an outer contour 38 which is not semi-circular but is rather elongate when viewed in the circumferential direction, with an outer contour 38 curved around a central axis 40 of the through opening 22. The outer contour 38 is thus concave when viewed from the central axis 40 of the through opening 22.

Figure 14:
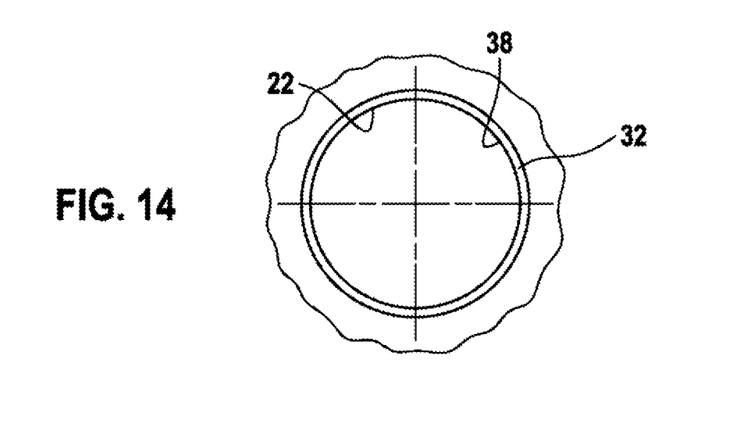
FIG. 14 shows an illustration similar to that shown in FIG. 7 of a fifth form of the through opening.
Figure 15:
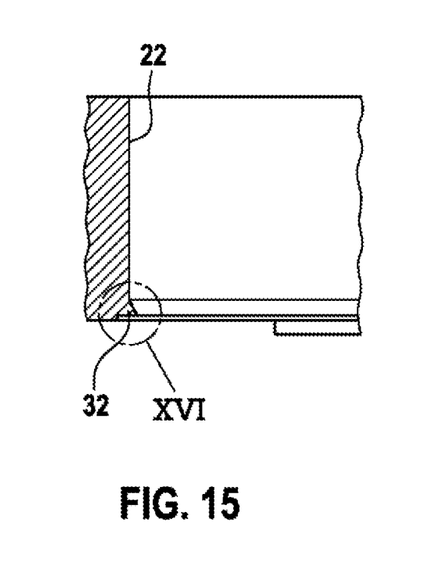
FIG. 15 shows an enlarged longitudinal section through a region of the form as shown in FIG. 14.
Figure 16:
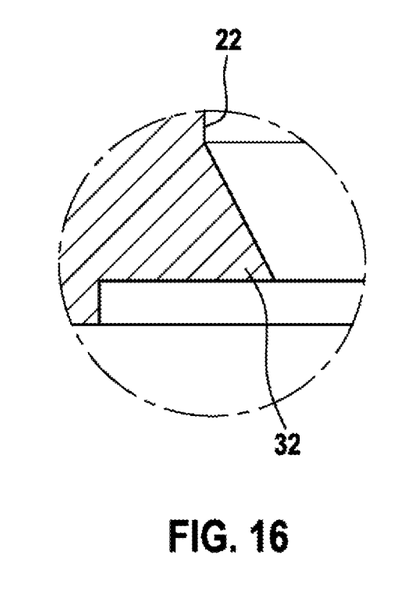
FIG. 16 shows a detail XVI of FIG. 15.

In the form of FIGS. 14-16, there is only one single projection 32, which however extends over the entire inner circumference of the through opening 22.

Figure 12:
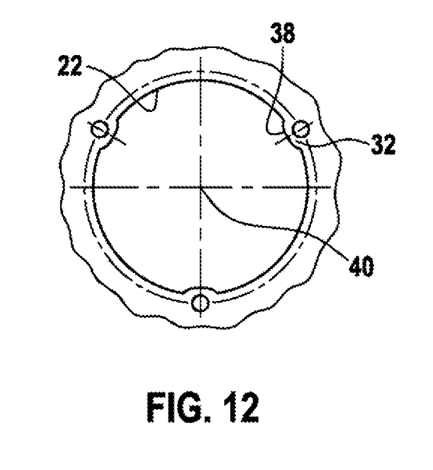
FIG. 12 shows an illustration similar to that shown in FIG. 7 of a fourth form of the through opening.
Figure 13:
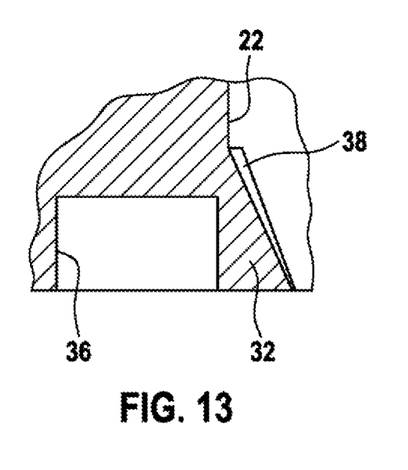
FIG. 13 shows an enlarged longitudinal section through a region of the through opening as shown in FIG. 12.
Figure 17:
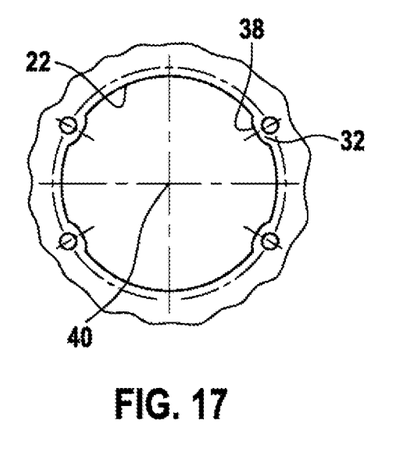
FIG. 17 shows an illustration similar to that shown in FIG. 7 of a sixth form of the through opening.
Figure 18:
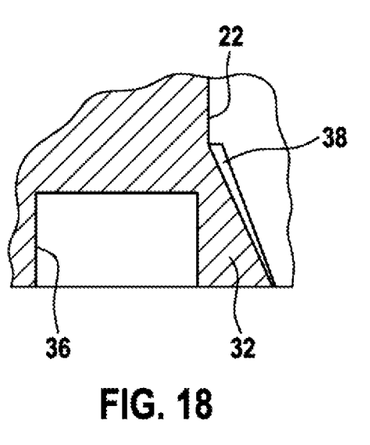
FIG. 18 shows an enlarged longitudinal section through a region of the form as shown in FIG. 17.

The form of the FIGS. 17 and 18 is a combination of the forms of FIG. 11 as well as FIGS. 12 and 13: Again, there are four projections 32 opposite each other in pairs, which, however, have an outer contour 40 which is elongate when viewed in the circumferential direction and which is specifically curved around the central axis 38 of the through opening 22.

Figure 19:
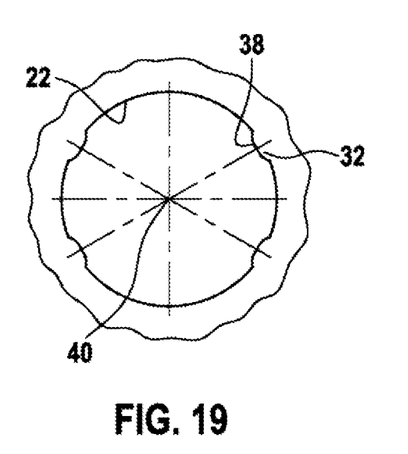
FIG. 19 shows an illustration similar to that shown in FIG. 7 of a seventh form of the through opening.
Figure 20:
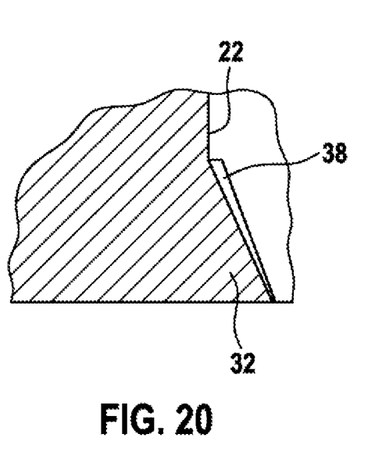
FIG. 20 shows an enlarged longitudinal section through a region of the form as shown in FIG. 19.

The projections 32 in the form as shown in FIGS. 19 and 20 are formed similarly to those of FIGS. 17 and 18, but are produced not by caulking but directly during the punching process of the through opening 22 by means of a corresponding mold of the punching tool. This eliminates the otherwise existing shaping on the axial face 34.

Figure 21:
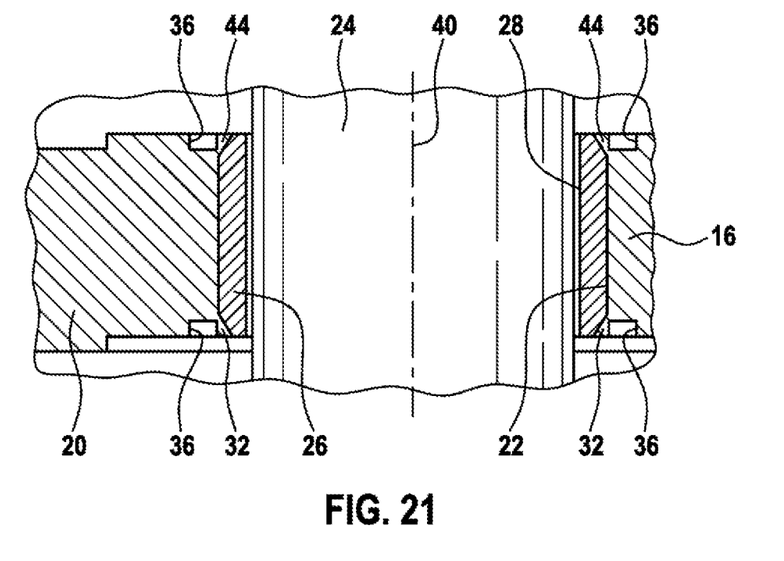
FIG. 21 shows a longitudinal section through an eighth form of a through opening of a fastening section of the fuel pump as shown in FIG. 1 with an inserted holding element and an inserted screw.
Figure 22:
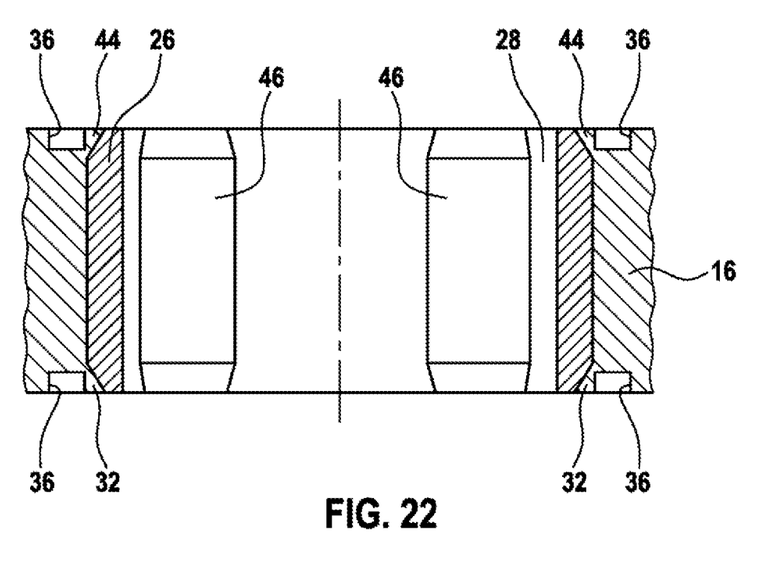
FIG. 22 shows an illustration similar to that shown in FIG. 21, but without the inserted screw.

In the case of the form as shown in FIGS. 21 and 22, multiple projections 44 are additionally also present in an end region 42, which in the installed position faces away from the base and which is the upper end region in FIGS. 21 and 22, wherein these projections 44 can also be formed differently than and in particular similarly to the projections 32 described in the Figures above. FIG. 22 also shows that, on the inside of the holding element 26, there are holding sections 46 projecting radially inward, which engage and hold the screw not shown in FIGS. 21 and 22.

The invention claimed is:

1. A fuel pump for a fuel injection system of an internal combustion engine, the fuel pump comprising:
    a pump housing; and
    a fastening section arranged on the pump housing, the fastening section configured to fasten the fuel pump to a base,
    wherein the fastening section defines a through opening configured to receive a holding element for a fastener, the through opening defining a central axis,
    wherein at least one radially inwardly directed first projection is arranged at least in a first end region of the through opening, the first end region facing toward the base in an installed position,
    wherein the first end region of the through opening is defined by an axial face of the fastening section,
    wherein the axial face is positioned in a first end plane perpendicular to the central axis,
    wherein the at least one first projection includes a first end surface positioned in the first end plane, and
    wherein the first end surface is spaced apart from the axial face.

2. The fuel pump as claimed in claim 1, wherein:
    the axial face is a first axial face,
    at least one radially inwardly directed second projection is arranged in a second end region of the through opening, the second end region facing away from the base in the installed position,
    the second end region of the through opening is defined by a second axial face of the fastening section,
    the second axial face is positioned in a second end plane perpendicular to the central axis and spaced apart from the first end plane,
    the at least one second projection includes a second end surface positioned in the second end plane, and
    the second end surface is spaced apart from the second axial face.

3. The fuel pump as claimed in claim 1, wherein the at least one first projection only extends over a part of an inner circumference of the through opening.

4. The fuel pump as claimed in claim 3, wherein the at least one first projection includes multiple projections arranged evenly distributed over the inner circumference.

5. The fuel pump as claimed in claim 3, wherein the at least one first projection includes multiple projections arranged unevenly distributed over the inner circumference.

6. The fuel pump as claimed in claim 1, wherein the at least one first projection includes a single projection.

7. The fuel pump as claimed in claim 6, wherein the single projection extends over the entire inner circumference of the through opening.

8. The fuel pump as claimed in claim 1, wherein the through opening is punched into the fastening section in such a way that the at least one first projection is produced in the through opening.

9. The fuel pump as claimed in claim 1, wherein:
    the at least one first projection is a material displacement of the fastening section displaced toward the central axis, and
    a void is defined directly between the at least one first projection and the fastening section.

10. The fuel pump as claimed in claim 1, wherein the at least one first projection, when viewed in an axial direction of the through opening, has a semi-circular outer contour.

11. The fuel pump as claimed in claim 1, wherein the at least one first projection, when viewed in an axial direction of the through opening, has an outer contour which is elongate when viewed in a circumferential direction.

12. The fuel pump as claimed in claim 11, wherein the outer contour is curved around the central axis of the through opening.

13. The fuel pump as claimed in claim 1, wherein the base is an engine block.

14. The fuel pump as claimed in claim 1, wherein the fastener is a screw.

* * * * *